(12) United States Patent
Purvis et al.

(10) Patent No.: US 7,711,770 B2
(45) Date of Patent: May 4, 2010

(54) METHOD AND SYSTEM FOR ENABLING A CONSUMER OF A MEDIA CONTENT TO COMMUNICATE WITH A PRODUCER

(75) Inventors: Christopher Purvis, La Crescenta, CA (US); Kyle Presetenback, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 158 days.

(21) Appl. No.: 12/080,694

(22) Filed: Apr. 4, 2008

(65) Prior Publication Data

US 2009/0254604 A1 Oct. 8, 2009

(51) Int. Cl.
*G06F 15/16* (2006.01)
*G06F 7/00* (2006.01)

(52) U.S. Cl. .............................. 709/201; 709/204; 707/1
(58) Field of Classification Search ........................ None
See application file for complete search history.

(56) References Cited

U.S. PATENT DOCUMENTS

| | | | |
|---|---|---|---|
| 6,662,357 B1 * | 12/2003 | Bowman-Amuah | 717/120 |
| 6,857,006 B1 * | 2/2005 | Nishizawa | 709/204 |
| 2002/0111934 A1 * | 8/2002 | Narayan | 707/1 |
| 2003/0001880 A1 * | 1/2003 | Holtz et al. | 345/716 |
| 2004/0055017 A1 * | 3/2004 | Delpuch et al. | 725/110 |
| 2004/0098466 A1 * | 5/2004 | Yoon et al. | 709/217 |
| 2005/0210145 A1 * | 9/2005 | Kim et al. | 709/231 |
| 2008/0294694 A1 * | 11/2008 | Maghfourian et al. | 707/104.1 |
| 2009/0024457 A1 * | 1/2009 | Foroutan | 705/12 |
| 2009/0100480 A1 * | 4/2009 | McQuaide, Jr. | 725/100 |
| 2009/0177742 A1 * | 7/2009 | Rhoads et al. | 709/203 |
| 2009/0235162 A1 * | 9/2009 | Nuccio et al. | 715/255 |

\* cited by examiner

*Primary Examiner*—John B. Walsh
(74) *Attorney, Agent, or Firm*—Farjami & Farjami LLP

(57) ABSTRACT

There is provided a method of enabling a consumer of a media content to communicate with a producer of the media content, comprising receiving an originating message concerning the media content from the consumer, assigning metadata to the originating message based on the media content or the content of the originating message, determining the producer based on the media content or the content of the originating message, forwarding the originating message through a message support network for distribution to the producer, retrieving a responsive message provided by the producer from among message updates stored on a message database, and associating the responsive message with one or more content subsets of the content according to the metadata assigned to the originating message. In one embodiment, media content and instructions comprising an interactive communication control application are stored on a computer readable medium.

20 Claims, 4 Drawing Sheets

METHOD AND SYSTEM FOR ENABLING A CONSUMER OF A MEDIA CONTENT TO COMMUNICATE WITH A PRODUCER

BACKGROUND OF THE INVENTION

1. Field of the Invention

The present invention relates generally to the distribution of information content. More particularly, the present invention relates to the distribution of computer mediated interactive information content.

2. Background Art

There is something confidence inspiring about media content that has been committed to a fixed and final presentation format. Compared to content generated spontaneously, content that is fixed for the purposes of presentation, whether through pre-recording in a particular data format, or through packaging for commercial distribution, for example, carries with it the promise of completeness and reliability typically associated with a finished product. A consumer of such content, be it information content, instructional content, or entertainment content, may experience an enhanced level of enjoyment in consuming the media content due to his or her reasonable expectation that the content has been thoughtfully and purposefully produced.

In addition to its advantageous reassurance of product quality, however, there are some unfortunate limitations associated with media content provided in a final presentation format, flowing from the same fixed characteristics that represent many of its virtues. Consider a movie or a documentary, for example. While a viewer of either of these media content products may be assured of seeing a well researched, polished presentation embodying reasonably high production values, the viewer is limited to his or her role as a passive consumer of the presentation. As a result, the viewer may be prevented from fully engaging the ideas or creative vision the producers of that media content seek to communicate; ideas and vision which might otherwise be accessible through a more interactive content consumption experience. While particularly relevant to pre-recorded content packaged for commercial distribution, similar undesirable obstacles to the communication of new ideas or artistic insights can arise during consumption of media content produced for presentation as live content, for instance, through a live broadcast.

In particular, where media content is complex or includes intellectually challenging subject matter, an inability to interact more fully, either with the media content itself, or with a producer of the media content having insight into its message, may result in a diminished understanding or appreciation of the ideas being presented. Accordingly, there is a need to overcome the drawbacks and deficiencies in the art by providing a solution enabling consumers of media content to more fully engage with the content being provided, by communicating interactively with producers of the media content.

SUMMARY OF THE INVENTION

There are provided methods and systems for enabling a consumer of a media content to communicate with a producer, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a method and system for enabling a consumer of pre-recorded content to communicate with a producer of the pre-recorded content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 1:
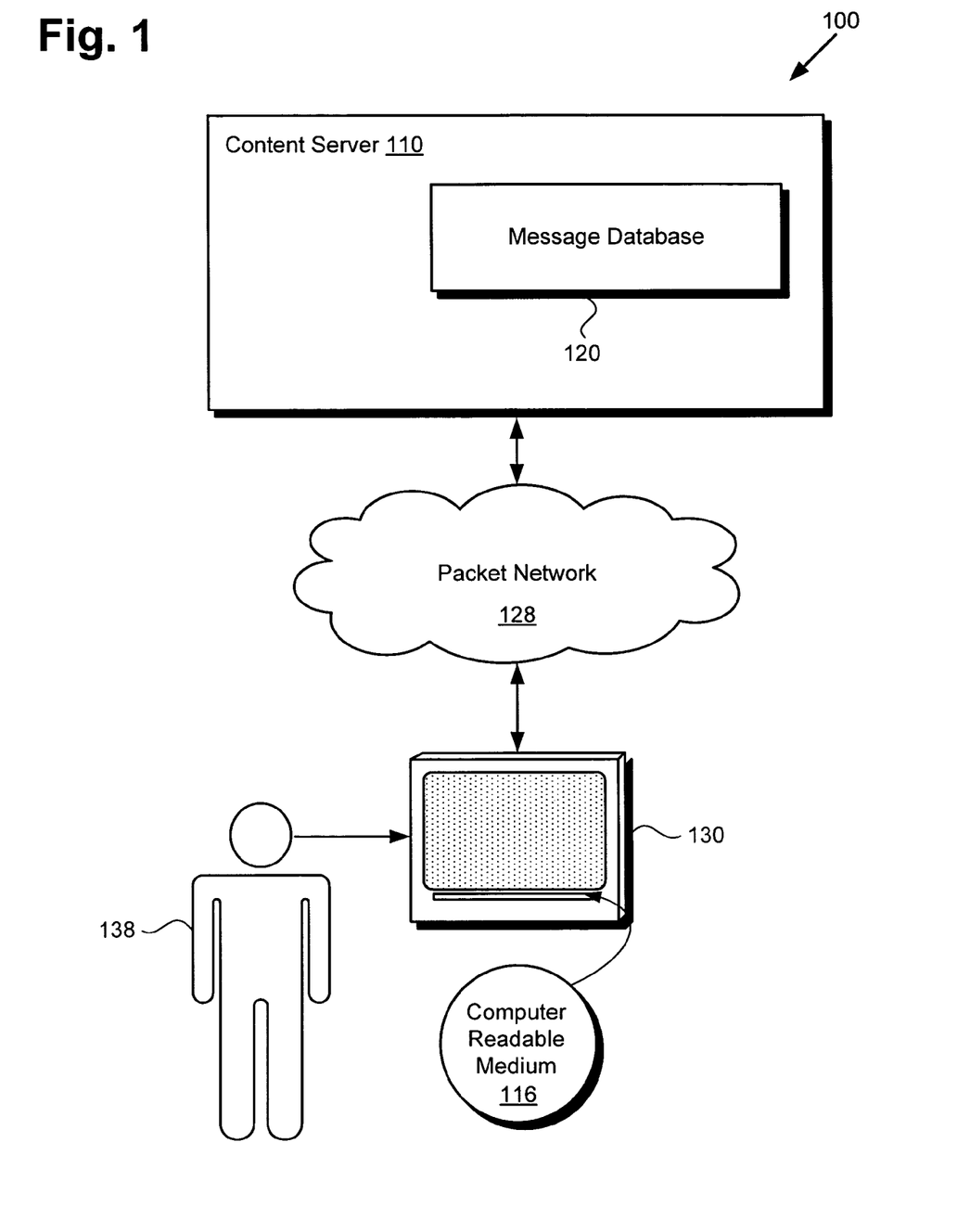
FIG. 1 shows a diagram of an exemplary message support network for enabling a consumer of media content to communicate with a producer of the media content, according to one embodiment of the present invention.

FIG. 1 shows a diagram of an exemplary message support network for enabling a consumer of pre-recorded media content to communicate with a producer of the pre-recorded media content, according to one embodiment of the present invention. In the embodiment of FIG. 1, message support network 100 comprises message database 120 residing on content server 110, and presentation module 130 for presentation of pre-recorded media content stored on computer readable medium 116. Also shown in FIG. 1 are packet network 128 and consumer 138 of the pre-recorded media content stored on computer readable medium 116, which may be a high-definition (HD) optical disc, such as a Blu-ray disc, for example.

According to the embodiment of FIG. 1, consumer 138 may utilize presentation module 130 and packet network 128 to access content server 110, to, for example, exchange messages with a producer of pre-recorded media content stored on computer readable medium 116. An interactive communication control application (not shown in FIG. 1), resident on computer readable medium 116, may be run locally on presentation module 130. In the embodiment of FIG. 1, the interactive communication control application may control playback of pre-recorded media content stored on computer readable medium 116, as well as mediate communication with a producer of the pre-recorded media content via content server 110. It is noted the computer readable medium 116 may have stored thereon one, or more than one item of pre-recorded media content, which may comprise, for instance, pre-recorded entertainment content.

For example, consumer 138 may generate an originating message concerning the pre-recorded media content being presented on presentation module 130, such as an HD movie recorded on a Blu-ray disc. The originating message may be received at an input to presentation module 130 and be assigned metadata based on the pre-recorded media content or the content of the originating message, such as a playback time code corresponding to a content subset of the pre-recorded media content during which the originating message is generated or received, for example. In one embodiment, the pre-recorded media content may also be authenticated by reference to a user identity associated with the pre-recorded media content. In the embodiment of FIG. 1, authentication, if it were to occur, could take the form of a self-authentication of computer readable medium 116, as a legitimately produced and distributed Blu-ray disc, for example.

The originating message may then be forwarded for distribution to a producer of the pre-recorded media content by the interactive communication control application running on presentation module 130, via packet network 128 and content server 110. Forwarding of the originating message may include determining the producer to whom the originating message is to be forwarded, as a preliminary or intermediate step, based on the media content or the content of the originating message. A determination of one or more appropriate producers for forwarding of the originating message may be made automatically by the interactive communication control application prior to initiating forwarding, or by a human or non-human filter accessible through content server 110, during the forwarding process, for example. The producer receiving a communication corresponding to the originating message may provide a responsive message, which can be stored as a message update on message database 120. Message database 120 may be configured to store a plurality of message updates including responsive messages.

Consumer 138 may then utilize the interactive communication control application stored on computer readable medium 116 to retrieve the message update containing a responsive message. In one embodiment, the responsive message may be associated with one or more content subsets of the pre-recorded media content stored on computer readable medium 116 according to the metadata assigned to the originating message. In one embodiment, the responsive message may be displayed during playback of relevant portions of the pre-recorded media content.

As a simple example implementing the embodiment of FIG. 1, a viewer of a movie pre-recorded on a Blu-ray disc and played back on presentation module 130, may think of questions concerning a particular movie scene, one or more characters, or the meaning of symbolism used in the production, during movie playback. The viewer may then interactively compose an originating message containing one or more of those questions and enter the message into presentation module 130, for example, using a remote control device in response to prompts provided by the interactive communication control application. Metadata based on the movie or the content of the originating message, for example, a time code corresponding to the content subset giving rise to the question, may be automatically assigned to the originating message by the interactive communication control application when the originating message is received.

The originating message may then be forwarded to a producer determined to be an appropriate recipient of the originating message, such as a screenwriter, or director, for example. For the purposes of the present application, a producer of media content, pre-recorded, as in the present embodiment, or otherwise, is any individual having production authority over the media content or responsive messages used as updates or supplements to the media content. Thus a producer may include an author, movie director, screen writer, set designer, costume designer, or an authorized representative of any one or more members of a production team, for example.

A responsive message, providing an answer to the question posed by consumer 138 may be received into message database 120 as a message update. In one embodiment, the interactive communication control application running on presentation module 130 may check for the presence of available message updates on content server 110 automatically, for example on a predetermined update schedule. When a message update is identified, the message update may be retrieved and consumer 138 notified, during that or a subsequent playback of the movie.

Figure 2:
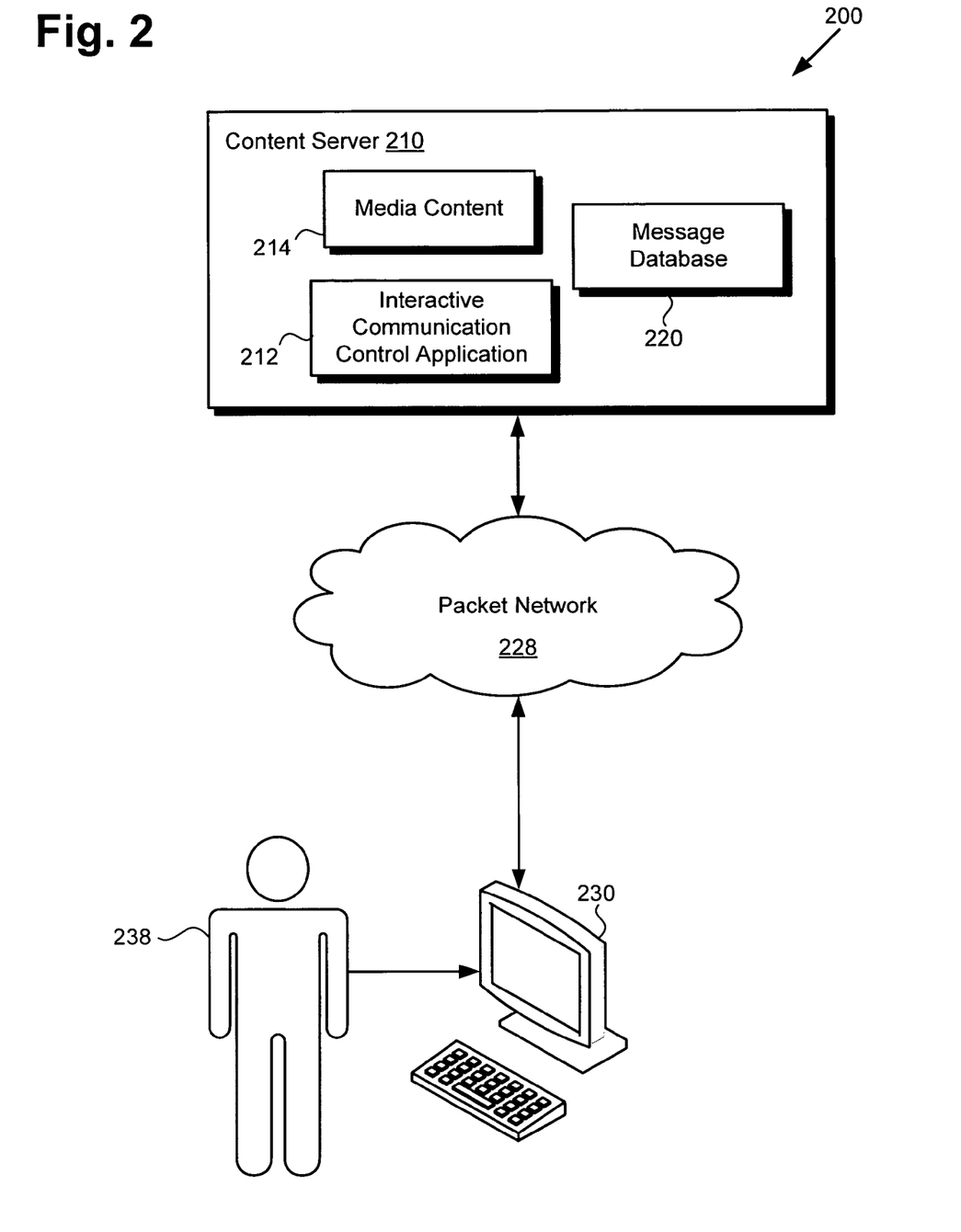
FIG. 2 shows a diagram of an exemplary message support network for enabling a consumer of media content to communicate with a producer of the media content, according to another embodiment of the present invention.

Turning now to FIG. 2, FIG. 2 shows a diagram of an exemplary message support network for enabling a consumer of media content to communicate with a producer of the media content, according to another embodiment of the present invention. In the embodiment of FIG. 2, message support network 200 comprises message database 220 residing on content server 210, and presentation module 230 for presentation of media content 214, corresponding respectively to message database 120 residing on content server 110, presentation module 130, and pre-recorded media content stored on computer readable medium 116, in FIG. 1. It is noted that although the media content of FIG. 1 has been described as pre-recorded media content, that characterization is exemplary only. Thus, media content 214, in FIG. 2, may comprise pre-recorded media content, or live media content, or a combination of more than one type of media content, for example. Message support network 200 further comprises interactive communication control application 212, previously described, but not shown in FIG. 1. Also appearing in FIG. 2 are packet network 228 and consumer 238 of media content 214, corresponding respectively to packet network 128 and consumer 138, in FIG. 1.

According to the embodiment of FIG. 2, consumer 238 may use presentation module 230 and packet network 228 to access interactive communication control application 212 and media content 214 on content server 210. Consumer 238 may then utilize interactive communication control application 212 to control presentation of media content 214 on presentation module 230, as well as to mediate communication with a producer of media content 214, via content server 210. It is noted that although presentation module 230 is represented as a personal computer (PC) in FIG. 2, in other embodiments presentation module 230 may be another type of personal communication system such as a mobile telephone, a digital media player, personal digital assistant (PDA), a wireless computer, a gaming console, or a personal entertainment system including an optical disc player such as an HD optical disc or Blu-ray disc player, for example.

As shown in FIG. 2, interactive communication control application 212 can be accessed through packet network 228. In that instance, interactive communication control application 212 may comprise a web application, accessible over a packet network such as the Internet. Alternatively, interactive communication control application 212 may reside on a server supporting a local area network (LAN), for instance, or included in another type of limited distribution network. In another embodiment, one example of which is shown in FIG.

1, media content 214 and interactive communication control application 212 may reside on computer readable storage medium 116, such as a Blu-ray disc, or other format HD optical disc, for example. Analogously, in another embodiment, message database 220, in FIG. 2, may reside on a server supporting a LAN or other limited distribution network.

Figure 3:
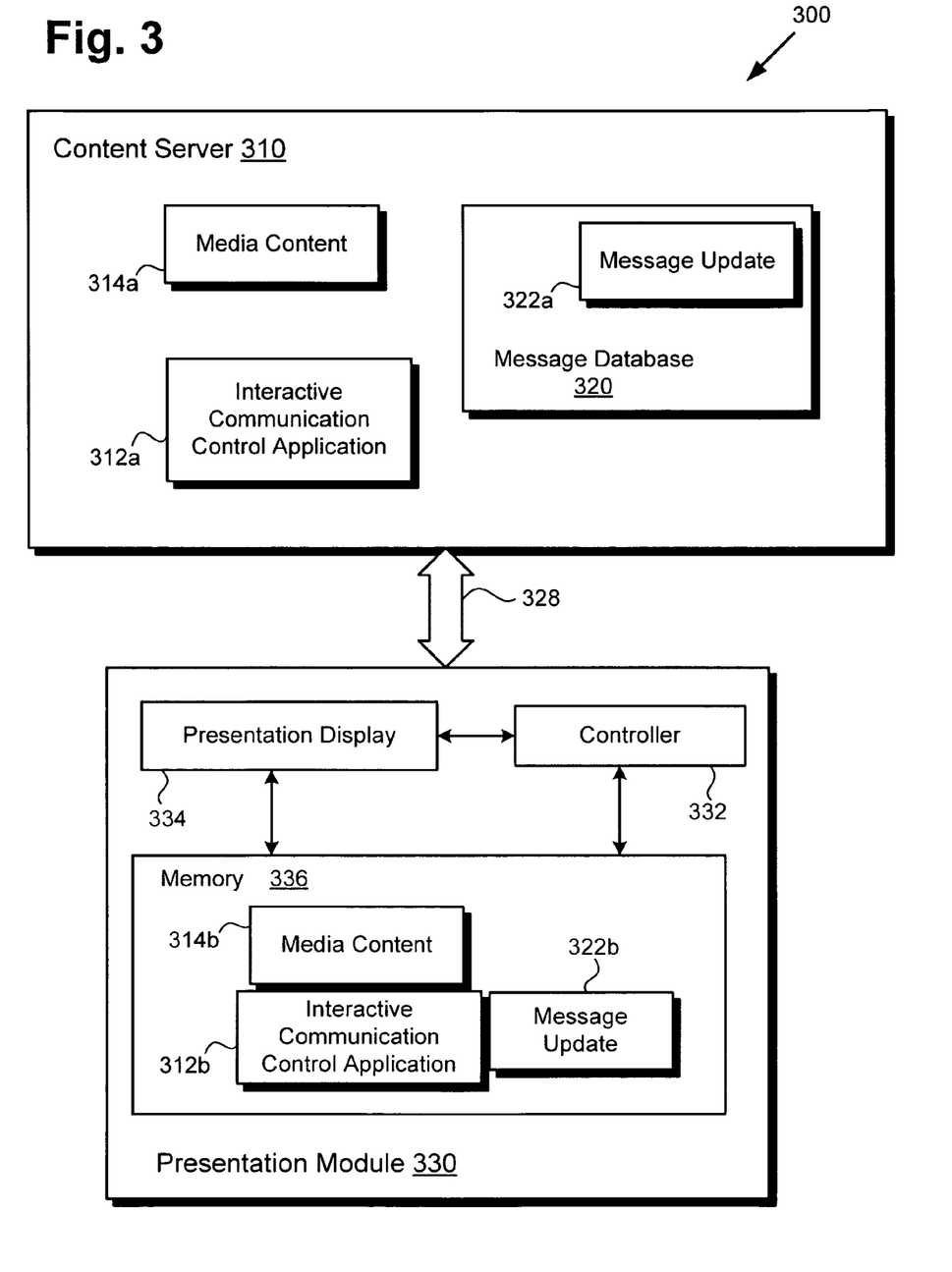
FIG. 3 shows a more detailed exemplary embodiment of a message support network for enabling a consumer of media content to communicate with a producer of the media content, according to one embodiment of the present invention.

Moving on to FIG. 3, FIG. 3 provides a more detailed embodiment showing exemplary message support network 300 for enabling a consumer of media content to communicate with a producer of the media content. Message support network 300, in FIG. 3, comprises presentation module 330 receiving a data transfer via communication link 328 from content server 310. As may be seen from FIG. 3, content server 310 includes message database 320 storing message update 322a, interactive communication control application 312a, and media content 314a. Presentation module 330, in FIG. 3, corresponds to presentation modules 130 and 230 appearing, respectively, in FIGS. 1 and 2. As shown in FIG. 3, presentation module 330 comprises controller 332, presentation display 334, and memory 336.

Content server 310 and message database 320, in FIG. 3, correspond respectively to content servers 110 and 210, and message databases 120 and 220, shown in FIGS. 1 and 2. As may be seen from FIG. 3, content server 310 includes interactive communication content application 312a and media content 314a, corresponding respectively to interactive communication content application 212 and media content 214, in FIG. 2, as well as analogous elements described as residing on computer readable medium 116, but not shown, in FIG. 1. Message update 322a stored in message database 320 has been described in the discussion surrounding FIGS. 1 and 2, but is not shown in those previous figures. Although the embodiment of FIG. 3 shows interactive communication control application 312a, media content 314a, and message database 320 residing in common on content server 310, that representation is exemplary only, and in another embodiment, interactive communication control application 312a, media content 314a, and message database 320 may be distributed over more than one server or storage medium. FIG. 3 further shows interactive communication control application 312b, media content 314b, and message update 322b.

In the present embodiment, interactive communication control application 312b, media content 314b, and message update 322b are located in memory 336, having been received from content server 310 via communication link 328. In another embodiment, however, one or more of interactive communication control application 312b, media content 314b, and message update 322b may not exist as local assets of presentation module 330. Instead, in one such embodiment, for example, interactive communication control application 312b may be an asset local to presentation module 330, and be utilized to access media content 314a and/or message update 322a, stored on content server 310.

Returning to the embodiment shown in FIG. 3 in which interactive communication control application 312b, media content 314b, and message update 322b are imported to be local assets of presentation module 330, communication link 328 may represent download of interactive communication control application 312b, media content 314b, and message update 322b over a packet network, for example. In another embodiment, communication link 328 may represent transfer of one or more of interactive communication control application 312b, media content 314b, and message update 322b, from a compact disc read-only memory (CD-ROM) or other portable computer readable medium. Once transferred, interactive communication control application 312b, media content 314b, and message update 322b may be stored in client memory 336 and run locally on presentation module 330, as shown in FIG. 3. It is noted that communication link 328 is shown as a two-way communication, to correspond to ongoing communication via content server 310, to forward an originating message to a producer or to retrieve additional message updates stored on message database 320, for example.

Controller 332 may be the central processing unit for presentation module 330, for example, in which role controller 332 runs the presentation module firmware and/or operating system, mediates display of pre-recorded content 314b on presentation display 334, and facilitates execution of interactive communication control application 312b. Presentation display 334, under the control of controller 332, may be utilized to display media content 314b, as well as originating and/or responsive messages, such as message update 322b. Implementation of message support system 300 enables a consumer of media content 314b to communicate with a producer of that content.

Figure 4:
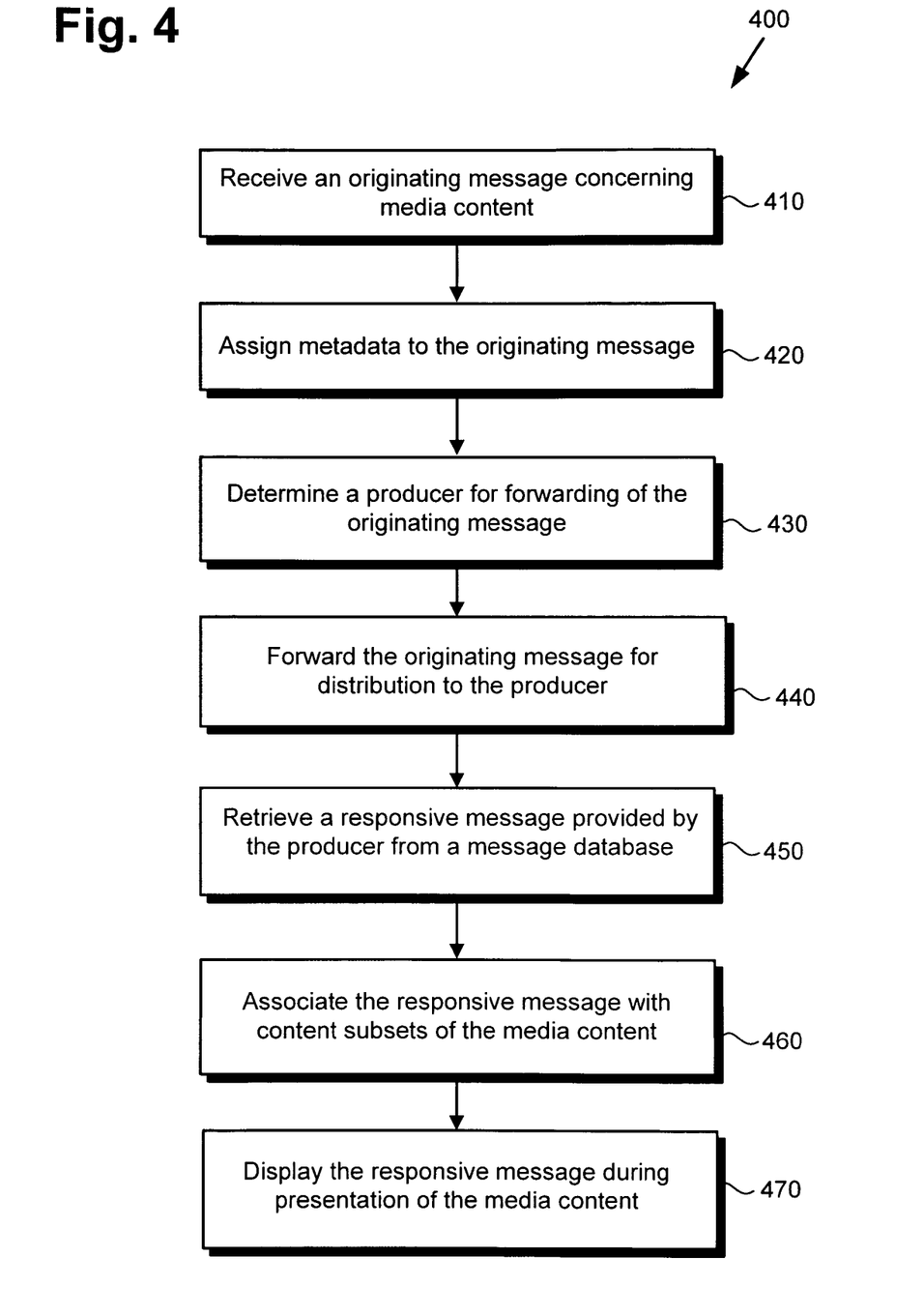
FIG. 4 is a flowchart presenting a method of enabling a consumer of media content to communicate with a producer of the media content, according to one embodiment of the present invention.

The present invention will now be further described by FIG. 4, which presents flowchart 400 describing an exemplary method of enabling a consumer of media content to communicate with a producer of the media content. Certain details and features have been left out of flowchart 400 that are apparent to a person of ordinary skill in the art. For example, a step may consist of one or more substeps or may involve specialized equipment or materials, as known in the art. While steps 410 through 470 in FIG. 4 are sufficient to describe a particular embodiment of the present method, other embodiments may utilize steps different from those shown in flowchart 400, or may include more, or fewer steps.

Turning to step 410 of flowchart 400 and referring to FIG. 3, step 410 comprises receiving an originating message concerning media content 314b from a consumer of that content. Step 410 may occur as the result of a communication received at presentation module 330, for example. In one embodiment, receipt of an originating message may correspond to receipt at interactive communication control application 312b of an originating message. The originating message may be entered using one or more inputs available on presentation module 330, such as a presentation module remote control device, for example, not shown in FIG. 3. It is noted that the presentation module utilized by a consumer may be selected from a variety of personal communication systems, as previously described. As a result, a consumer may employ a corresponding variety of possible local inputs, such as mouse commands, touch screen commands, keyboard commands, and the like, to send an originating message in step 410.

Continuing with step 420 of flowchart 400, step 420 comprises assigning metadata to the originating message. Metadata may be assigned by interactive communication control application 312b, for example, based on media content 314b or on the content of the originating message. Metadata may be assigned to identify media content 314b as being a particular item of movie content, such as a specific movie, for example. As another example, metadata may be assigned to identify a time code describing the timing, during presentation of media content 314b, at which the originating message was received in step 410.

In one embodiment, a method of enabling a consumer of media content to communicate with a producer of the media content may include an authentication step, in which authentication of a user identity associated with the media content is performed. Where, as in FIG. 1, the media content and interactive communication control application mutually reside on a computer readable medium, such as a Blu-ray disc, for example, authentication may effectively comprise self-authentication of the computer readable medium as a legitimately produced and distributed Blu-ray disc. Alternatively, authentication may include data exchange over communication link 328, as in FIG. 3, in which registration of a valid user identity corresponding to ownership or authorized use of the media content is confirmed.

The exemplary method of flowchart 400 continues with step 430, which comprises determining a producer for forwarding of the originating message based on media content 314b or the content of the originating message. In some embodiments, additional filtering of the originating message may be implemented to assist in determination of one or more suitable recipient producers for distribution of the originating message. Additional filtering, when utilized, may be performed by human or automated filters accessible to interactive communication control application 312b via content server 310.

Moving now to step 440 of flowchart 400, step 440 comprises forwarding the originating message for distribution to the producer. Forwarding of the originating message may occur through message support network 300, in FIG. 3, for example, and may be initiated by interactive communication control application 312b. In some embodiments, forwarding of the originating message may occur as an automated process, following determination step 430 performed according to determination criteria programmed into interactive communication control application 312b. In other embodiments, forwarding may be initiated by interactive communication control application 312b but include additional determining stages including additional filtering by human or automated filters, as described previously with respect to step 430.

Continuing with step 450 of flowchart 400 and FIG. 3, step 450 comprises retrieving a responsive message provided by the producer from among message updates such as message update 322a, accessible through message support network 300. Retrieval of a responsive message may be performed utilizing interactive communication control application 312b, and may occur in response to any of several types of notification that one or more message updates are available. For example, where a consumer has registered as an owner or authorized user of media content 314b, retrieval may occur in response to a notification message sent as an email to an address corresponding to the registration user identity. In one embodiment, retrieval may occur in response to notification provided as a (Really Simple Syndication) RSS feed or Atom feed available to a registered personal communication device, for example. Alternatively, where interactive communication control application 312b and media content 314b coexist on a computer readable medium such as a Blu-ray disc, notification and retrieval of a responsive message may occur automatically when the computer readable medium is subsequently inserted into presentation module 330.

In some embodiments, interactive communication control application 312b may support one or more consumers specified retrieval filters to define identification parameters when retrieving message updates. For example, a default retrieval setting may include retrieval of message updates responsive to originating messages received only from the consumer utilizing presentation module 330. Additional retrieval settings selectable by that consumer may command identification and retrieval of other message updates responsive to other consumers of the same or similar content. Those message updates responsive to originating messages provided by other consumers may be identified on the basis of various discrimination criteria, such as similarity in presentation time code, subject matter, scene selection, a particular character, or a particular performer, for example. In those embodiments, retrieval in step 450 may include retrieval of message updates responsive to originating messages from other consumers that match the discrimination criteria selected by the consumer of media content 314b, in addition to message updates responsive specifically to originating messages received from that consumer.

Step 460 of flowchart 400 comprises associating the responsive message with content subsets of the pre-recorded content. In one embodiment, the responsive message may be associated with one or more content subsets of the pre-recorded content according to the metadata assigned to the originating message. In the case of a movie or other entertainment content pre-recorded on an HD optical disc, for example, an originating message comprising a question about a particular scene or section of dialog may be assigned metadata corresponding to the playback time code for that content subset. A responsive message corresponding to that originating message may then be associated with the playback time code identified by the metadata assigned to the originating message. Moreover, in some embodiments, the responsive message may be associated with more than one content subset, either in addition to, or as alternatives to the playback time code. For example, an originating message may concern a particular type of symbolism utilized in a movie. A retrieved responsive message corresponding to that originating message may then be associated with several scenes within the movie in which that symbolism appears.

Moving on to step 470 of flowchart 400, described in combination with FIG. 3, in some embodiments the present method may include display of the responsive message during presentation of the media content. In those embodiments in which interactive communication control application 312b also controls presentation of media content 314b, for example, display of a responsive message contained in message update 322b may be integrated with presentation of media content 314b. In that way, a responsive message associated with one or more content subsets corresponding to a particular presentation time code or one or more scenes, may be displayed at the appropriate time or appear in conjunction with the appropriate scenes during presentation of the media content, for example.

Thus, the present application discloses a method and message support network for enabling a consumer of media content to communicate with a producer of the media content. By receiving and forwarding an originating message concerning an item of media content, from a consumer of that content to one of its producers, the present disclosure describes an approach to content support that enables communication between consumers and producers of media content. By retrieving message updates responsive to the concerns expressed by the consumer, one disclosed embodiment enhances the consumer experience by providing timely answers to consumer questions. By further associating responsive messages received from producers with content subsets of the media content giving rise to the communication exchange, various embodiments disclosed in the present application make it possible to integrate display of the responsive messages with presentation of the media content. Thus, the present disclosure describes a method and system enabling consumers of media content to more fully engage with the content being provided, by communicating interactively with producers of the content. It should be noted that although some of the above-described embodiments of the present invention are discussed in conjunction with pre-recorded media contents, other embodiments of the present invention may extend to live broadcasts or live media contents.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of enabling a consumer of a media content to communicate with a producer of the media content, the method comprising:
   receiving an originating message concerning the media content from the consumer;
   assigning metadata to the originating message based on the media content or the content of the originating message;
   determining the producer based on the media content or the content of the originating message;
   forwarding the originating message through a message support network for distribution to the producer;
   retrieving a responsive message provided by the producer from among message updates stored on a message database accessible through the message support network; and
   associating the responsive message with one or more content subsets of the media content according to the metadata assigned to the originating message.

2. The method of claim 1, further comprising controlling presentation of the media content on a presentation module.

3. The method of claim 2, wherein the presentation module is one of a mobile telephone, a digital media player, a personal digital assistant (PDA), a wired or wireless computer, a gaming console, and an optical disc player.

4. The method of claim 1, further comprising displaying the responsive message during presentation of the media content.

5. The method of claim 1, wherein the media content comprises entertainment content.

6. The method of claim 1, wherein the media content comprises a high-definition movie.

7. The method of claim 1, further comprising authenticating a user identity associated with the media content.

8. A message support network for enabling a consumer of a media content to communicate with a producer of the media content, the message support network comprising:
   a content server;
   a message database accessible through the content server, the message database configured to store a plurality of message updates including responsive messages; and
   an interactive communication control application configured to mediate communication between the consumer and the producer via the content server by receiving an originating message concerning the media content, assigning metadata to the originating message based on the media content or the content of the originating message, forwarding the originating message for distribution to the producer, retrieving a responsive message from the message database, and associating the responsive message with one or more content subsets of the media content according to the metadata assigned to the originating message.

9. The message support network of claim 8, wherein the interactive communication control application is further configured to control presentation of the media content.

10. The message support network of claim 8, further comprising a presentation module for presentation of the media content.

11. The message support network of claim 10, wherein the presentation module is one of a mobile telephone, a digital media player, a personal digital assistant (PDA), a wired or wireless computer, a gaming console, and an optical disc player.

12. The message support network of claim 8, wherein the media content comprises entertainment content.

13. The message support network of claim 8, wherein the media content comprises a high-definition movie.

14. The message support network of claim 8, wherein the media content comprises content recorded on a Blu-ray disc.

15. A computer readable medium having stored thereon at least one item of media content, and instructions comprising an interactive communication control application, which, when executed by a presentation module, perform a method comprising:
   receiving an originating message concerning the at least one item of media content;
   assigning metadata to the originating message based on the at least one item of media content or the content of the originating message;
   forwarding the originating message through a message support network for distribution to a producer;
   retrieving a responsive message provided by the producer from among message updates stored on a message database accessible through the message support network; and
   associating the responsive message with one or more content subsets of the at least one item of media content according to the metadata assigned to the originating message.

16. The computer readable medium of claim 15, wherein the method further comprises controlling presentation of the at least one item of media content on the presentation module.

17. The computer readable medium of claim 15, wherein the computer readable medium comprises a high-definition optical disc.

18. The computer readable medium of claim 15, wherein the computer readable medium comprises a Blu-ray disc.

19. The computer readable medium of claim 15, wherein the at least one item of media content comprises entertainment content.

20. The computer readable medium of claim 15, wherein the determining the producer for the forwarding based on the media content or the content of the originating message.

* * * * *

UNITED STATES PATENT AND TRADEMARK OFFICE
CERTIFICATE OF CORRECTION

| | | |
|---|---|---|
| PATENT NO. | : 7,711,770 B2 | Page 1 of 1 |
| APPLICATION NO. | : 12/080694 | |
| DATED | : May 4, 2010 | |
| INVENTOR(S) | : Purvis et al. | |

It is certified that error appears in the above-identified patent and that said Letters Patent is hereby corrected as shown below:

Title page, item [75], second-named inventor's last name, "Presetenback" should be changed to -- Prestenback --.

Signed and Sealed this

Thirty-first Day of August, 2010

David J. Kappos
*Director of the United States Patent and Trademark Office*